US010495512B2

(12) United States Patent
David et al.

(10) Patent No.: US 10,495,512 B2
(45) Date of Patent: Dec. 3, 2019

(54) METHOD FOR OBTAINING PARAMETERS DEFINING A PIXEL BEAM ASSOCIATED WITH A PIXEL OF AN IMAGE SENSOR COMPRISED IN AN OPTICAL DEVICE

(71) Applicant: THOMSON Licensing, Issy-les-Moulineaux (FR)

(72) Inventors: Pierre David, Nantes (FR); Valter Drazic, Betton (FR); Laurent Blonde, Thorigné-Fouillard (FR); Paul Kerbiriou, Thorigne-Fouillard (FR); Olivier Bureller, Cesson Sevigne (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 51 days.

(21) Appl. No.: 15/669,387

(22) Filed: Aug. 4, 2017

(65) Prior Publication Data

US 2018/0038733 A1    Feb. 8, 2018

(30) Foreign Application Priority Data

Aug. 5, 2016    (EP) ..................................... 16306019

(51) Int. Cl.
*G01J 1/42*         (2006.01)
*G02B 26/02*        (2006.01)
(Continued)

(52) U.S. Cl.
CPC ............ *G01J 1/4257* (2013.01); *G02B 26/02* (2013.01); *G02B 26/0841* (2013.01);
(Continued)

(58) Field of Classification Search
CPC .................................................... G01J 1/4257
(Continued)

(56) References Cited

U.S. PATENT DOCUMENTS

| 5,918,192 A | 6/1999 | Tomaszewski |
|---|---|---|
| 7,092,079 B2 | 8/2006 | Riza et al. |

(Continued)

FOREIGN PATENT DOCUMENTS

| EP | 3144889 | 3/2017 |
|---|---|---|
| EP | 3144890 | 3/2017 |

OTHER PUBLICATIONS

Kannala et al., "A Generic Camera Model and Calibration Method for Conventional, Wide-Angle, and Fish-Eye Lenses", IEEE Transactions on Pattern Analysis and Machine Intelligence, vol. 28, No. 8, Aug. 2006, pp. 1335-1340.

(Continued)

*Primary Examiner* — Tarifur R Chowdhury
*Assistant Examiner* — Omar H Nixon
(74) *Attorney, Agent, or Firm* — Meagher Emanuel Laks Goldberg & Liao, LLP

(57) ABSTRACT

A method for obtaining, for at least one pixel of an image sensor comprised in an optical device, parameters defining a pixel beam is described. The method is remarkable in that it includes determining a direction of a chief ray associated with at least one pixel of the image sensor from the features of an optical system associated with the optical device, determining a set of pixels formed in a screen of a display device, the set of pixels comprising at least one pixel close to a point corresponding to an intersection of the chief ray and the screen, and the set of pixels comprising only pixels which are detected by the at least one pixel of the image sensor, when they are illuminated.

15 Claims, 11 Drawing Sheets

(51) Int. Cl.
*G02B 26/08* (2006.01)
*G02B 27/00* (2006.01)
*G06T 7/80* (2017.01)
*G06T 7/73* (2017.01)

(52) U.S. Cl.
CPC ..... *G02B 27/0012* (2013.01); *G02B 27/0075* (2013.01); *G06T 7/75* (2017.01); *G06T 7/80* (2017.01); *G06T 2207/10052* (2013.01)

(58) Field of Classification Search
USPC .................................................. 356/121
See application file for complete search history.

(56) References Cited

U.S. PATENT DOCUMENTS

| | | | |
|---|---|---|---|
| 2004/0070565 A1* | 4/2004 | Nayar | G06K 9/4661 345/156 |
| 2004/0239653 A1* | 12/2004 | Stuerzlinger | G06F 3/038 345/183 |
| 2008/0088842 A1* | 4/2008 | Schultz | G01J 4/04 356/367 |
| 2013/0222606 A1* | 8/2013 | Pitts | H04N 5/2254 348/187 |
| 2013/0300875 A1* | 11/2013 | Strandemar | H04N 5/217 348/164 |
| 2013/0322745 A1* | 12/2013 | Lim | H04N 9/73 382/162 |
| 2015/0271409 A1* | 9/2015 | Imoto | H04N 17/004 345/589 |
| 2017/0024044 A1* | 1/2017 | Li | G06F 3/0412 |

OTHER PUBLICATIONS

Knyaz, V., "Multi-Media Projector—Single Camera Photogrammetric System for Fast 3d Reconstruction", International Archives of Photogrammetry, Remote Sensing and Spatial Information Sciences, Commission V Symposium, Newcastle upon Tyne, United Kingdom, 2010, pp. 343-347.

Vaish et al., "Using Plane + Parallax for Calibrating Dense Camera Arrays", IEEE Conference on Computer Vision and Pattern Recognition, Washington, D. C., USA, Jun. 27, 2004, pp. 1-8.

Sen et al., "Dual Photography", ACM SIGGRAPH 2005, Los Angeles, California, USA, Jul. 31, 2005, pp. 745-755.

Georgeiv et al., "Spatio-Angular Resolution Tradeoffs in Integral Photography", Eurographics Symposium on Rendering, Nicosia, Cyprus, Jun. 26, 2006, pp. 263-272.

Zhang, Z., "A Flexible New Technique for Camera Calibration", IEEE Transactions on Pattern Analysis and Machine Intelligence, vol. 22, No. 11, Nov. 2000, pp. 1330-1334.

Johannsen et al., "On the Calibration of Focused Plenoptic Cameras", LNCS vol. 8200, Time-of-Flight and Depth Imaging, Sensors, Algorithms, and Applications, Springer, Berlin, Jan. 2013, pp. 302-317.

La Torre et al., "An Embedded Smart Agile Pixel Imager for Lasers", 6th European Embedded Design in Education and Research; Milano, Italy, Sep. 11, 2014, pp. 230-234.

Li et al., "Generic Calibration of an Integral Imaging Camera and its Applications on 2D Integral Image Reconstruction and 3D Scene Reconstruction", 8th World Congress on Intelligent Control and Automation, Jinan, China, Jul. 6, 2010, pp. 1830-1835.

Grossberg et al., "The Raxel Imaging Model and Ray-Based Calibration", International Journal of Computer Vision, vol. 61, No. 2, Oct. 2004, pp. 119-137.

Bothe et al, "Vision ray calibration for the quantitative geometric description of general imaging and projection optics in metrology", Applied Optics, vol. 49, No. 30, Oct. 20, 2010, pp. 5851-5860.

Klein, P., "On the Intersection Equation of a Hyperboloid and a Plane", Applied Mathematics, vol. 4, Dec. 2013, pp. 40-49.

* cited by examiner

METHOD FOR OBTAINING PARAMETERS DEFINING A PIXEL BEAM ASSOCIATED WITH A PIXEL OF AN IMAGE SENSOR COMPRISED IN AN OPTICAL DEVICE

REFERENCE TO RELATED APPLICATIONS

This application claims priority from European Application No. 16306019.7, entitled "A METHOD FOR OBTAINING PARAMETERS DEFINING A PIXEL BEAM ASSOCIATED WITH A PIXEL OF AN IMAGE SENSOR COMPRISED IN AN OPTICAL DEVICE", filed on Aug. 5, 2016, the contents of which are hereby incorporated by reference in its entirety.

TECHNICAL FIELD

The disclosure relates to a technique for obtaining parameters defining a pixel beam associated with a pixel of an image sensor comprised in an optical device (that could be either a conventional camera or a light field acquisition camera).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A pixel beam (as depicted in FIG. 1, and referenced 10) represents a volume occupied by a set of rays of light in an object space of an optical system referenced 11 of an optical device (not shown on FIG. 1, that can be either a conventional camera or a light field acquisition camera). Hence, a given pixel referenced 12 of an image sensor referenced 13, is associated with a pixel beam (i.e. a set of rays of light in the object space) that is detected by said given pixel 12, and that passes through a pupil 14 of said optical system 14. The optical system 14 may be a combination of lenses fit for photo or video cameras. A pupil of an optical system is defined as the image of an aperture stop as seen through said optical system, i.e. the lenses of the optical acquisition system, which precedes said aperture stop. An aperture stop is an opening which limits the amount of light which passes through the optical system of the optical acquisition system. For example, an adjustable blade diaphragm located inside a camera lens is the aperture stop for the lens. The amount of light admitted through the diaphragm is controlled by the diameter of the diaphragm opening which may adapt depending of the amount of light a user of the camera wishes to admit. For example, making the aperture smaller reduces the amount of light admitted through the diaphragm, and, simultaneously, increases the depth of focus. The apparent size of a stop may be larger or smaller than its physical size because of the refractive action of a portion of the lens. Formally, a pupil is the image of the aperture stop through all lenses of the optical acquisition system located between the physical stop and the observation space.

More precisely, a pixel beam 10 can be defined as a pencil of rays of light that reach a given pixel 22 when propagating through the optical system 11 via an entrance pupil 14. As light travels on straight lines in free space, the shape of such a pixel beam 10 can be defined by two sections, one being the conjugate 15 of the pixel 12, and the other being the entrance pupil 14. The pixel 12 is defined by its non-null surface and its sensitivity map.

Thus, a pixel beam also referenced 20, as shown on FIG. 2, may be represented by a hyperboloid of one sheet supported by two elements: the pupil referenced 24 and the conjugate referenced 25 of the pixel 12 in the object space.

A hyperboloid of one sheet is a ruled surface that can support the notion of pencil of rays of light and is compatible with the notion of "étendue" of physical light beams, notion linked to the preservation of energy across sections of the physical light beams.

As represented on FIG. 3, a hyperboloid of one sheet referenced 30 is mostly identical to its asymptotic cones referenced 31, 32, except in the fundamental region of its smallest section, called the waist referenced 35, which corresponds to the conjugate 15 in the object space. For plenoptic systems, such as light-field cameras, this is the region where space sampling by multiple path rays is performed. Sampling space with cones in this region is not adequate, as pixel 12 sensitivity is significant on some tens of square microns on its surface and cannot be represented by a mathematical point with infinitely small surface as would be a cone tip.

It is possible to define each pixel beam 10, 20, 30 by four independent parameters: $z_P, \theta_x, \theta_y$, a defining the position and size of the pixel conjugate 15, 35, in front of the pupil 14, 24 and by six pupilar parameters $x_0, y_0, z_0, \theta_{x0}, \theta_{y0}$, r which define the position, orientation and radius of the pupil 14, 24. These six pupilar parameters are common to the collection of pixel beams sharing a same pupil 14, 24. Indeed, a pixel beam represents the volume occupied by a set of rays of light in the object space of the optical system 11 sensed by the pixel 12 through the pupil 14, i.e. to a given couple pixel 12/pupil 14, 24 corresponds a unique pixel beam 10, 20, 30, but a plurality of distinct pixel beams can be supported by a same pupil 14, 24.

An origin O of a coordinate system (x,y,z) in which the parameters of the pixel beam 10, 20, 30 are defined corresponds to the center of the pupil 14 as shown on FIG. 1, where the z axis defines a direction normal to the surface of the pupil 14, 24.

Usually, as represented on FIG. 4, the first ray to be considered for describing a pixel beam is its axis or chief ray referenced 41. The chief ray 41 corresponds to the z axis of the hyperboloid 10, 20, 30, as represented on FIG. 2.

Indeed, the parameters $\theta_x, \theta_y$ define chief ray directions relative to the entrance of the pupil 14 center. They depend on the pixel 12 position on the sensor 13 and on the optical elements of the optical system 11. More precisely, the parameters $\theta_x, \theta_y$ represent shear angles defining a direction of the conjugate 15 of the pixel 12 from the center of the pupil 14.

The parameter $z_P$ represents a distance of the waist 35 of the pixel beam 10, 20, 30, or the conjugate 15 of the pixel 12, along the z axis.

The parameter a represents the radius of the waist 35 of the pixel beam 10, 20, 30.

For optical systems 11 where optical distortions and field curvatures may be modelled, the parameters $z_P$ and a can depend on the parameters $\theta_x$ and $\theta_y$ via parametric functions.

The four independent parameters are related to the pixel 12 and its conjugate 15.

The six complementary pupilar parameters defining a pixel beam 10, 20, 30 are:

r which represents the pupil 14, 24 radius, $x_0, y_0, z_0$ which represent the coordinates of the pupil 24, 34 center in the (x,y,z) coordinate system, and $\theta_{x0}, \theta_{y0}$ which represent the orientation of the pupil 14, 24 in the reference (x,y,z) coordinate system.

These six pupilar parameters are related to the pupil 14, 24. Another parameter c can be defined. Such a parameter c is dependent on the parameters $z_P$ and a related to the pixel 12 and its conjugate 15 and on the parameters r related to the pupil 14, 24. The parameter c defines the angular aperture a of the pixel beam 10, 20, 30 and is given by the formula $$\tan(\alpha) = \frac{a}{c}.$$

Thus, the expression of the parameter c is given by the following equation:

$$c^2 = \frac{a^2 z_P^2}{r^2 - a^2} \quad (1)$$

The coordinates (x,y,z), in the object space, of points belonging to the surface delimiting the pixel beam 10, 20, 30 are function of the above defined sets of parameters related to the pupil 14, and to the conjugate 15 of the pixel. Thus, equation (2) enabling the generation of the hyperboloid of one sheet representing the pixel beam 10, 20, 30 is:

$$\frac{(x - z \cdot \tan(\theta_x))^2}{a^2} + \frac{(y - z \cdot \tan(\theta_y))^2}{a^2} - \frac{(z - z_P)^2}{c^2} = 1 \quad (2)$$

Hence, there is a need to provide a technique for determining (via an approximation or an estimation) these parameters that defines a pixel beam associated with a pixel on an image sensor via the execution of a calibration process for a given optical device.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for obtaining, for at least one pixel of an image sensor comprised in an optical device, parameters defining a pixel beam. The method is remarkable in that it comprises:
  determining a direction of a chief ray associated with said at least one pixel of said image sensor from the features of an optical system associated with said optical device;
  determining a set of pixels comprised in a screen of a display device, said set of pixels comprising at least one pixel close to a point corresponding to an intersection of said chief ray and said screen, and said set of pixels comprising only pixels which are detected by said at least one pixel of said image sensor, when they are illuminated;
and wherein said determining said set of pixels comprises:
  illuminating at least one pixel around said point corresponding to the intersection of said chief ray and said screen;
  verifying if said at least one illuminated pixel is detected by said at least one pixel of said image sensor;
and wherein said method further comprises determining said parameters defining said pixel beam associated with said at least one pixel of said image sensor from a subset of pixels comprised in said set of pixels, said subset of pixels corresponding to a cross section of said pixel beam.

In a preferred embodiment, the method is remarkable in that said verifying associates a detected light intensity value by said least one pixel of said image sensor with said illuminated pixel on said screen.

In a preferred embodiment, the method is remarkable in that said set of pixels corresponds to a matrix of pixels.

In a preferred embodiment, the method is remarkable in that said subset of pixels has a shape close to a conic.

Indeed, as mentioned in the article "*On the Intersection Equation of a Hyperboloid and a Plane*" by Peter Paul Klein, in Applied Mathematics, 2013, 4, 40-49, the intersection between a plane and a hyperboloid corresponds to a conic.

In a preferred embodiment, the method is remarkable in that a plurality of set of pixels is determined, and each set of pixels being determined by changing a distance between the display device and the optical device.

In a preferred embodiment, the method is remarkable in that, for a given distance between the display device and the optical device, a plurality of set of pixels is determined by performing said method in parallel for several pixels of said image sensor that are positioned far enough to each other in such way that no intersection of said plurality of set of pixels occurs.

In a preferred embodiment, the method is remarkable in that said optical device is a conventional camera.

In a preferred embodiment, the method is remarkable in that said direction of said chief ray is determined from a classical intrinsic/extrinsic calibration method.

In a preferred embodiment, the method is remarkable in that said optical device is a plenoptic camera.

In a preferred embodiment, the method is remarkable in that said direction of said chief ray is determined from focused images and a classical intrinsic/extrinsic calibration method.

In a preferred embodiment, the method further comprises modifying said features of said optical system associated with said optical device, said modifying comprising:
  obtaining a distortion displacement associated with each pixel of said optical system;
  obtaining derivative of distortion displacement associated with each pixel of said optical system;
  modifying said features of said optical system associated with said optical device as a function of said distortion displacement and derivative of distortion displacement.

In a preferred embodiment, the distortion displacement is determined by:
  selecting a set of pixels on the image sensor of the optical device;
  obtaining positions of each pixels comprised in the set of selected pixels onto a display device, comprising a screen, delivering a set of positions; and for each position:
illuminating pixels of the screen around such position, pixels of the screen around a translation of such position according to a first direction, and pixels of the screen around a translation of such position according to a second direction which is perpendicular to said first direction;
detecting, at the image sensor, the positions of three-pixel regions that have detected the illuminating pixels of the screen;
determining a variation of displacement and angle defined by a position of these three-pixel regions compared to a 90° value.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc.

In another embodiment of the disclosure, it is proposed an electronic device for obtaining, for at least one pixel of an image sensor comprised in an optical device, parameters defining a pixel beam. The electronic device comprises a memory, and at least one processor coupled to the memory. The at least one processor is remarkable in that it is configured to:
determine a direction of a chief ray associated with said at least one pixel of said image sensor from the features of an optical system associated with said optical device;
determine a set of pixels comprised in a screen of a display device, said set of pixels comprising at least one pixel, close to a point corresponding to an intersection of said chief ray and said screen, and said set of pixels comprising only pixels which are detected by said at least one pixel of said image sensor, when they are illuminated;
and wherein when the at least one processor determines said set of pixels, it is further configured to:
illuminate at least one pixel around said point corresponding to the intersection of said chief ray and said screen;
verify if said at least one illuminated pixel is detected by said at least one pixel of said image sensor;
and wherein said at least one processor is further configured to determine said parameters defining said pixel beam associated with said at least one pixel of said image sensor from a subset of pixels comprised in said set of pixels, said subset of pixels corresponding to a cross section of said pixel beam.

In another embodiment of the disclosure, the electronic device is remarkable in that when said at least one processor is configured to verify, it associates a detected light intensity value by said least one pixel of said image sensor with said illuminated pixel on said screen.

In another embodiment of the disclosure, the electronic device is remarkable in that said set of pixels corresponds to a matrix of pixels.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

In one embodiment of the disclosure, it is proposed to determine via a calibration technique some features related to the pixels beams associated with the pixels from the image sensor 13 of the optical device. These features are linked to some cross section of pixels beams as it is explained in the following.

Figure 1:
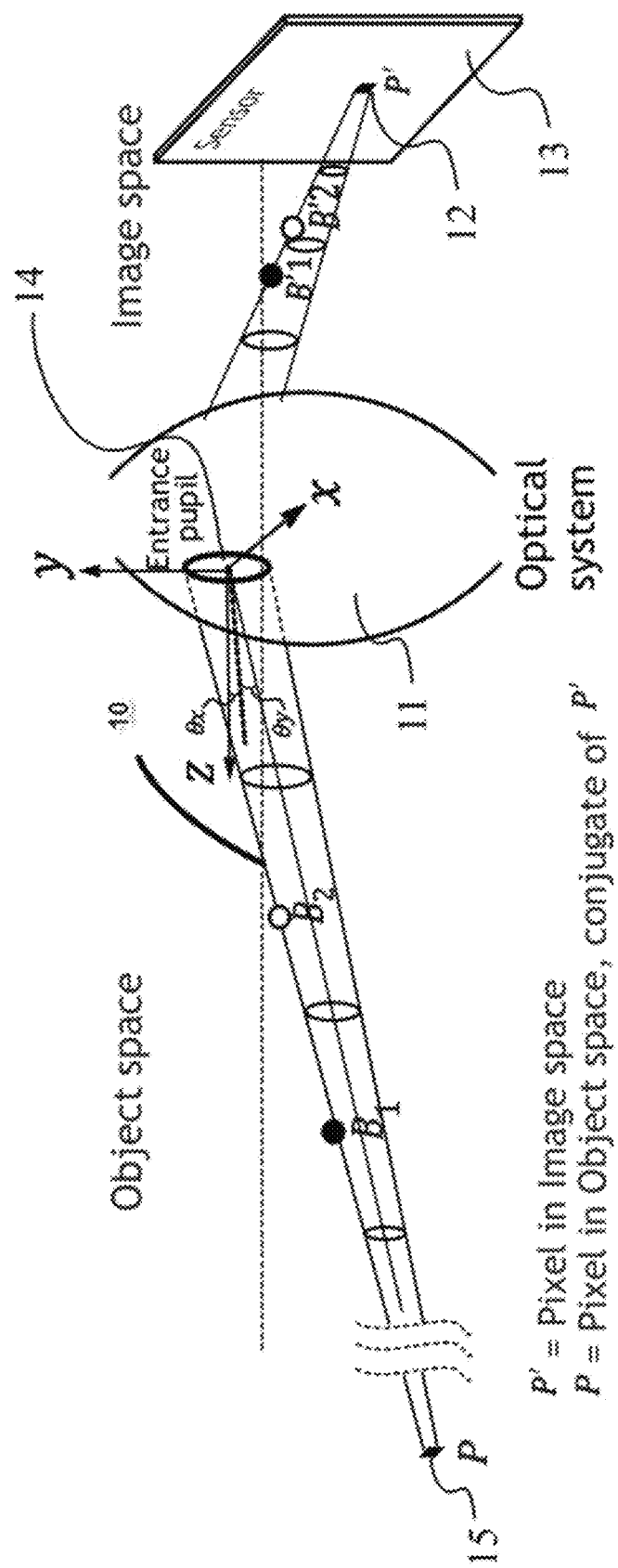
FIG. 1 represents a volume occupied by a set of rays of light in an object space of an optical system of an optical device.
Figure 2:
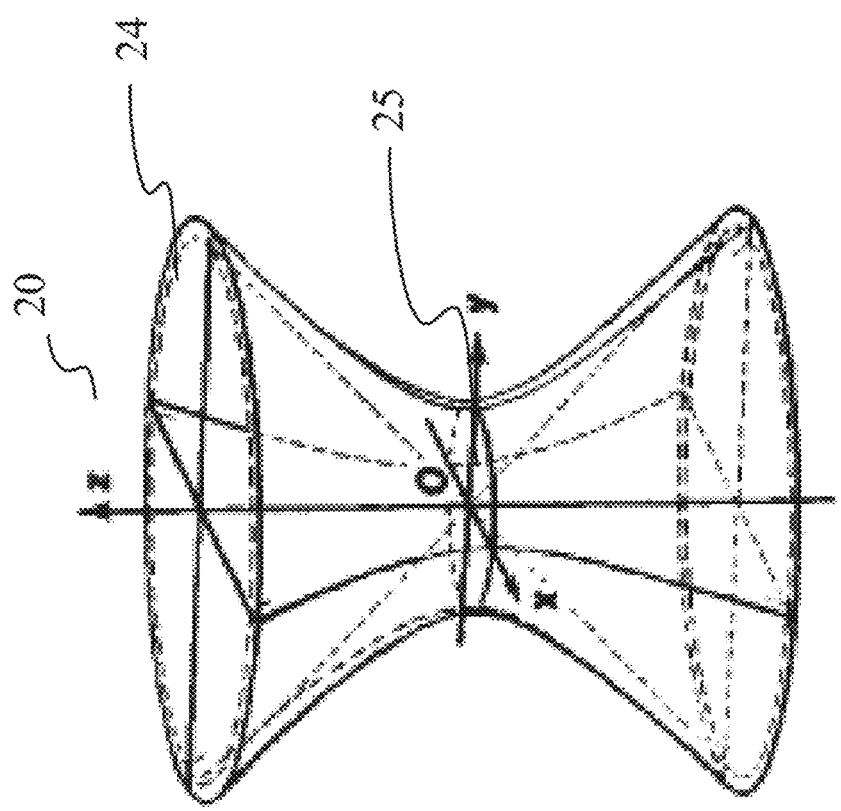
FIG. 2 represents a hyperboloid of one sheet.
Figure 3:
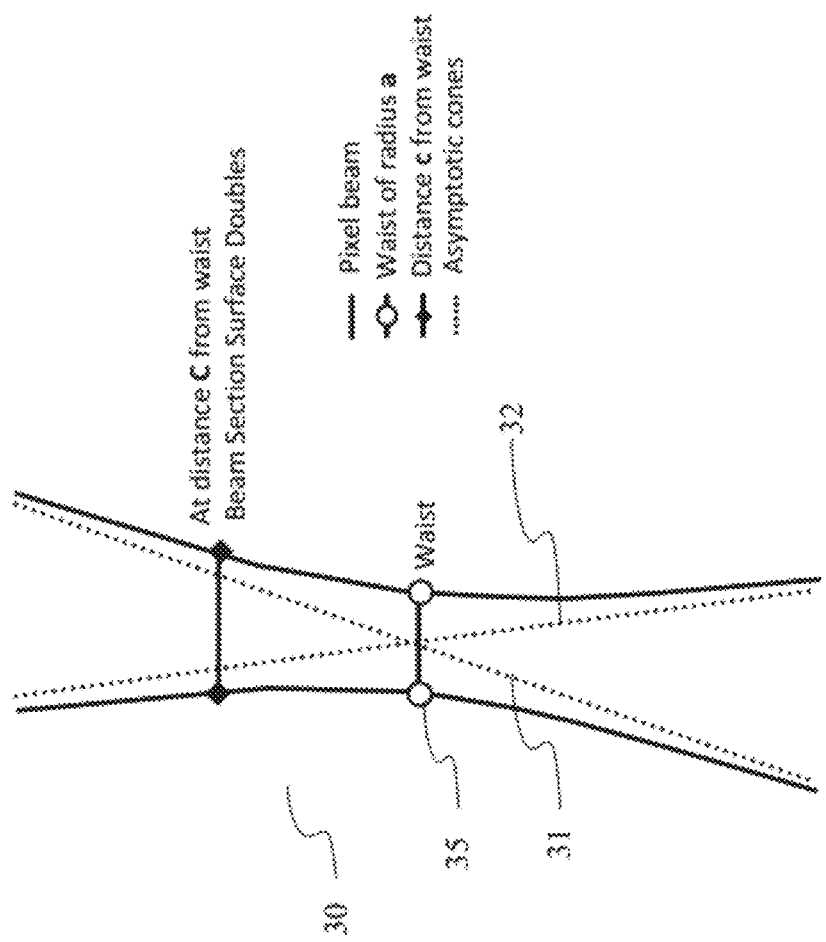
FIG. 3 represents another view of a hyperboloid of one sheet.
Figure 4:
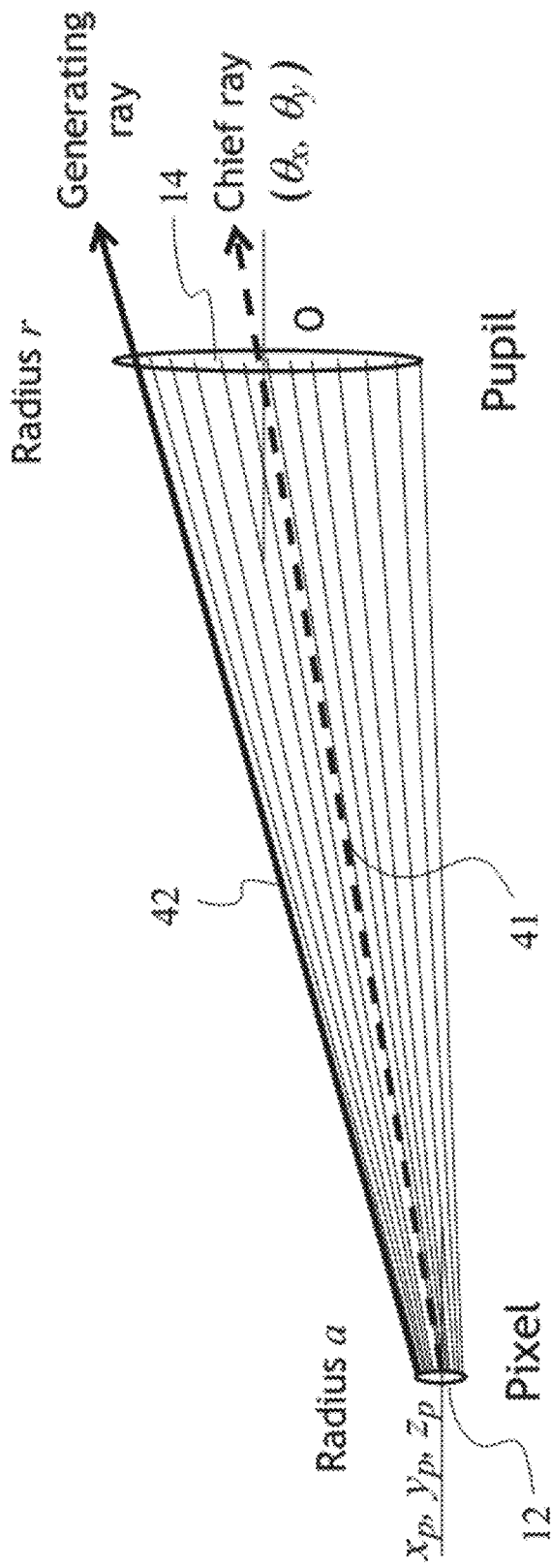
FIG. 4 represents a chief ray and a generating ray defining a pixel beam.
Figure 5:
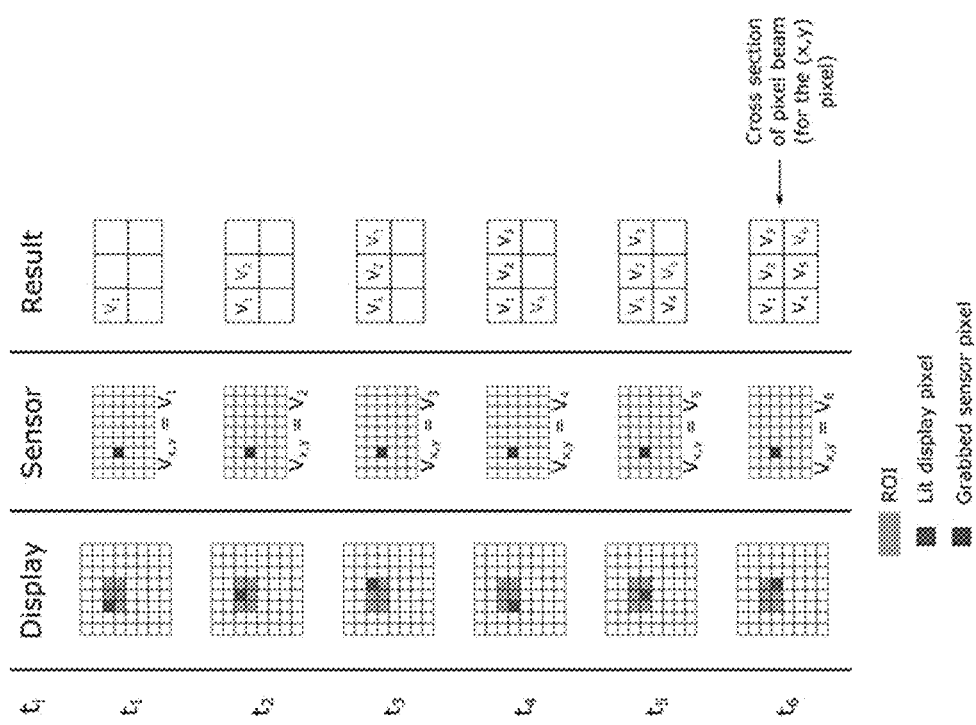
FIG. 5 presents some steps of a technique for obtaining information related to a cross section of a pixel beam according to one embodiment of the disclosure.

The FIG. 5 presents some steps of a technique for obtaining information related to a cross section of a pixel beam according to one embodiment of the disclosure.

In one embodiment of the disclosure, it is proposed to use a display device for obtaining information of the pixels beams associated with pixels from an optical device via the use of cross section information of pixel beams.

The display device corresponds to a multiple source point emitting device (for example a single light source in a collimator is replaced by several light sources arranged in a grid or lattice) of known relative position and emissive power. As well the display device can be a monitor or projection display. In one embodiment of the disclosure, a projector with corrected uniformity and having a Lambertian screen is used.

In one embodiment of the disclosure, the optical device can be a camera (with potentially multiple light paths) for which correspondence between pixels on one or several sensor plane(s) and beams in the observed object space is to be determined.

In one embodiment of the disclosure, the camera includes optical elements projecting the observed object space into the sensor plane(s) (e.g. including a main lens and optionally a microlense, or including multiple camera lenses like in a camera array configuration).

In one embodiment of the disclosure, an identified light path from the observed object space to the image plane, defined by an entrance pupil (e.g. one of multiple microlense pupils retro-imaged or one of multiple cameras entrance pupils in a camera array).

In one embodiment of the disclosure, the source and sensor are supposed linear or calibrated to linear in their electro-optic transfer functions.

In one embodiment of the disclosure, an initialization step which determines the region of interest (ROI) in the screen of the display device (position and size) and the distance between the optical device and the display device has to be done. Indeed, for a given pixel of the image sensor, a region of interest should be determined and such region of interest comprises the cross section of the pixel beam associated with the given pixel.

In order to determine the region of interest associated with a given pixel, first of all, it is proposed to estimate the projection of the given pixel from the image sensor on the screen of the display device. The direction of the projection is the same as the orientation of the chief ray associated with the given pixel. For classical cameras, we can perform a classical intrinsic/extrinsic calibration (as described in the article "*A flexible new technique for camera calibration*" by Zhang, Z. (2000), published in Pattern Analysis and Machine Intelligence, IEEE Transactions on, 22(11), 1330-1334) to know the projection. For plenoptic cameras, we can use focused images (creating a virtual camera) and perform a classical intrinsic/extrinsic calibration on it. Then we can project/unproject any sensor pixel knowing the transformation and inverse transformation from a raw image to a focused image. Obviously, it is also necessary to know the distance between the optical device and the display device. Indeed, we have to know at which distance the cross section of the pixel beam is from the optical device. For conventional cameras, we can use the extrinsic calibration. For plenoptic cameras, we can use the focused images as reference and place the cross sections relative to the virtual camera. Plenoptic cameras can also provide depth maps which can be calibrated, turning a virtual depth map into a metric depth map (see for example the article entitled: "*On the calibration of focused plenoptic cameras*" by Johannsen, O., Heinze, C., Goldluecke, B., & Perwaß, C. (2013), published in In Time-of-Flight and Depth Imaging. Sensors, Algorithms, and Applications (pp. 302-317). Springer Berlin Heidelberg.

Once we have the sensor pixel projection on the display, we light/illuminate the display pixel to the right next to it, we grab the sensor pixel and we check if its value is lower than the noise level. If not we iterate, switching on the display pixel to the left of said sensor pixel projection on the display, we repeat in the "left" direction until the sensor pixel value is no longer superior to the noise level. Then we do the same in the "right" direction, then "up" and then "down", thus scanning a cross. Adding a security margin, we have now the width and the height of the region of interest (ROI).

In another embodiment of the disclosure, the region of interest is determined by illuminating pixels randomly around the point corresponding to the intersection of the chief ray and the screen of the display device, and by choosing pixels that takes away this point. In a variant, a dichotomy process can be used.

The obtained region of interest can be a matrix of pixels as described in FIG. 5, on the screen of the display device. Hence, the cross section of the corresponding pixel beam should be included in such region of interest (the cross section corresponds to a subset of pixels of the region of interest). Then, it is necessary to determine a subset of pixels within the region of interest that corresponds explicitly to the cross section of the pixel beam.

Then, the proposed technique comprises the displaying of one source point at a time (with the region of interest) and the grabbing of the values detected by the given pixel 12 at the image sensor side.

More precisely, the proposed technique comprises:
  switching on a source point of the region of interest in the object space at a time $t_n$;
  grabbing the sensor pixel Pref(x,y) of which we want to measure the pixel beam;
  saving the value $V_{x,y}(t_n)=V_n$ in a ROI's size matrix (cf FIG. 5, the result is a matrix); and
  repeating each of the previous steps, always grabbing the evolving value of the same sensor pixel Pref, switching on another source point of the ROI.

In another embodiment of the disclosure, these steps (including the initialization step) are performed for various distances. Therefore, by doing so, it is possible to obtain for a given pixel of the image sensor, different cross section of the corresponding pixel beam.

Indeed, for a given region of interest, from the values of the matrix comprising the values $V_i$, it is possible to determine which pixels are part of the cross section of the pixel beam (via an elimination process which uses a comparison with a threshold).

Once different cross sections of the pixel beam are obtained, the profile of the whole beam in object space can be estimated (i.e. we can then determine parameters of a hyperboloid that is close (according to a Euclidian distance for example) to the obtained/measured shape of the estimated pixel beam). Therefore, the parameters defining a pixel beam (according to equation 2) can be obtained in that way.

The method here is described for a single pixel beam calibration but we can also parallelize the task, acquiring multiple cross sections for pixels at various positions on the sensor. The only condition is that their respective regions of interest do not overlap.

Figure 6:
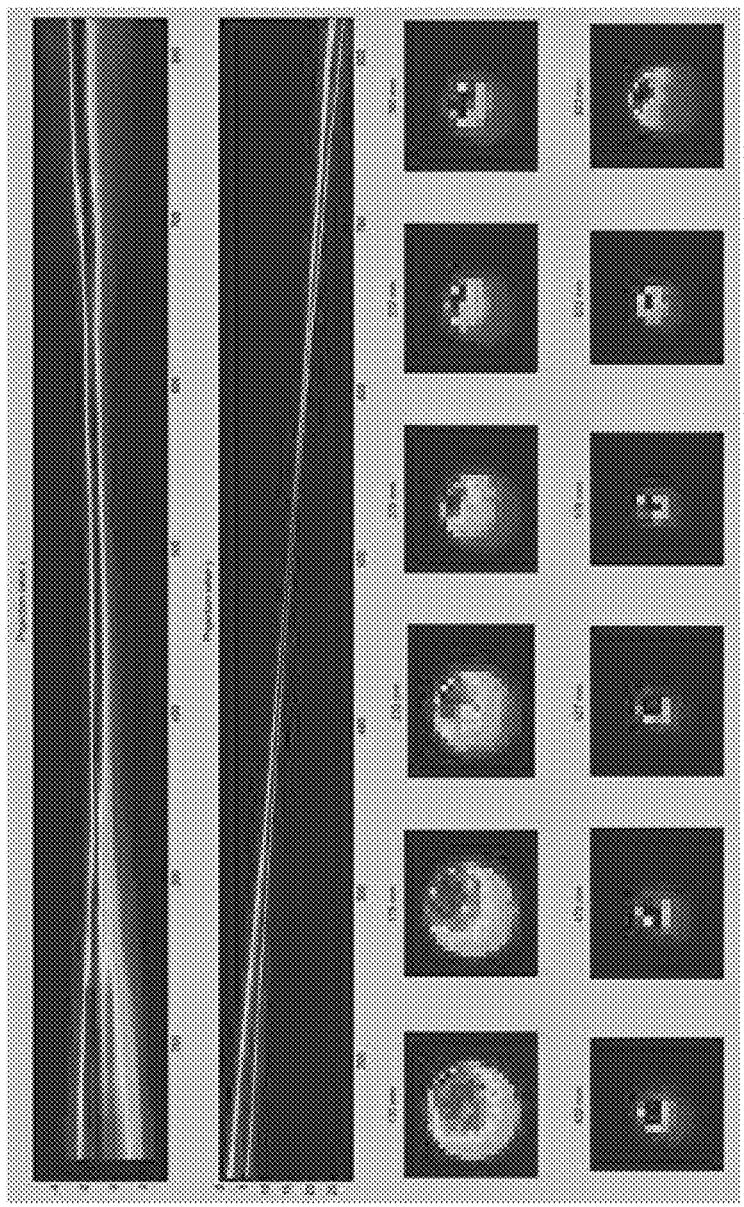
FIG. 6 presents some results obtained from the technique for obtaining information related to a cross section of a pixel beam according to one embodiment of the disclosure, for a pixel of a conventional camera.

The FIG. 6 presents some results obtained from the technique for obtaining information related to a cross section of a pixel beam according to one embodiment of the disclosure, for a pixel of a conventional camera. At the bottom of FIG. 6, the cross sections of the pixel beam that are acquired are displayed. On top of FIG. 6, we processed the data (with interpolations) to visualize the projection of the pixel beam on two orthogonal planes (scale is mm).

Hence, it is possible to determine the parameters of the hyperboloid approximating the estimated pixel beam. The estimated pixel beam is obtained from the cross sections measurements performed previously.

Figure 7:
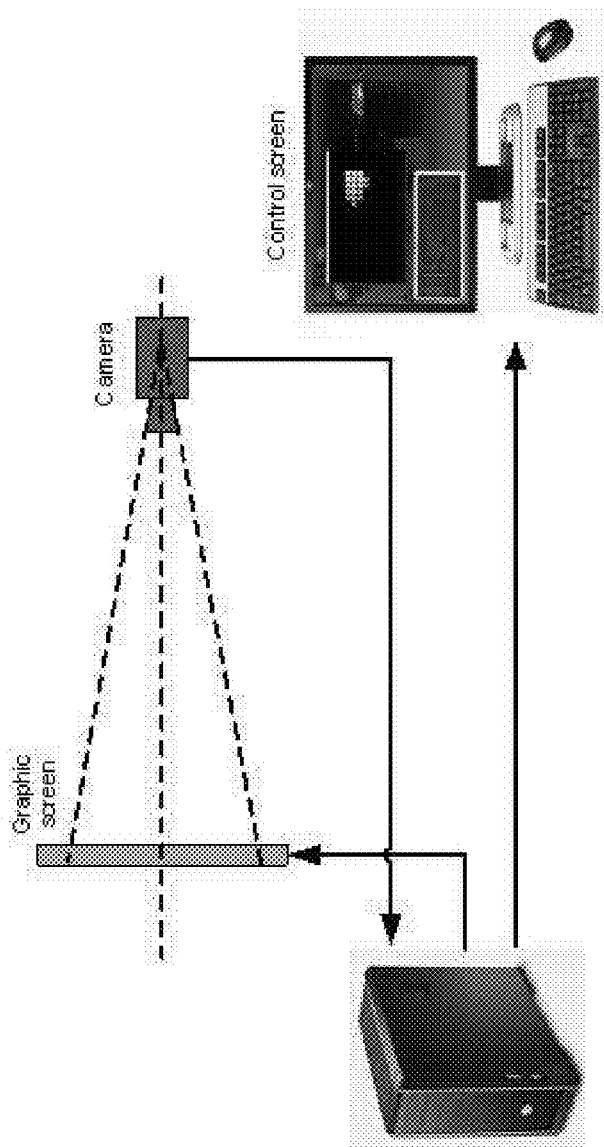
FIG. 7 presents a system for performing the method of obtaining parameters of a pixel beam according to one embodiment of the disclosure.

The FIG. 7 presents a system for performing the method of obtaining parameters of a pixel beam according to one embodiment of the disclosure.

In one embodiment, it is proposed to use a computer and two screens: one for controlling and displaying information to the user; the second one used in full screen is dedicated to display graphic shapes to make measurements. The optical device is linked to the PC via an USB3.0 link but other types of links could be used.

In one embodiment of the disclosure, the distance between the optical device and the display device that is used to make measurements is controlled by the computer via a camera dolly for example.

In order to determine, with accuracy, the chief ray, it is proposed in one embodiment of the disclosure to determine (or estimate) the distortions induced by the optical device (and more precisely by the optical system of the optical device).

Usually, distortion of a lenses system is estimated thanks to parametric equation systems associated with a perspective projection model.

In one embodiment of the disclosure, it is proposed to use a method to estimate distortion only based on measurements and independently of a projection.

As use of a parametric model consists in finding a low average error on the entire lens system, it leads to hide local distortion effect that cannot be represented by a global model.

Moreover, calibration using for instance a pinhole projection model is only accurate at the distance where calibration has been made. As the distortion parametric model estimation is computed simultaneously with the projection parameters model (focal length, projection of optical axis on sensor), this leads to average the mutual errors and then again to hide local distortion problems.

As example, we can describe the calibration performed by one of the most used library that is OpenCV.

The model is made of three parts (even if computation is resolved in only one step).

The first part comprises a classic 3D coordinate transformation to transform a point known in a 3D world coordinate system to a coordinate system attached to the camera (with Z axis aligned with the camera optical axis).

$$\begin{bmatrix} X \\ Y \\ Z \\ 1 \end{bmatrix}_C = \begin{bmatrix} r_{11} & r_{12} & r_{13} & T_x \\ r_{21} & r_{22} & r_{23} & T_y \\ r_{31} & r_{32} & r_{33} & T_z \\ 0 & 0 & 0 & 1 \end{bmatrix} \begin{bmatrix} X \\ Y \\ Z \\ 1 \end{bmatrix}_W$$

Where $[X\ Y\ Z\ 1]_C^T$ is the 3D point in camera coordinate system $[X\ Y\ Z\ 1]_w^T$ is the 3D point in world coordinate system $[r_{11}, \ldots r_{33}]$ are the coefficients of the rotation transformation (from world to camera)

$[T_x\ T_y\ T_z\ 1]^T$ is the translation vector (from world to camera).

Then when the point is "known" in the camera coordinate system, the projection itself is modeled via a pinhole model so that projection on sensor of the 3D point is given by $$\begin{Bmatrix} u \\ v \end{Bmatrix} = 1/Z \begin{Bmatrix} x = Xf_x + Zc_x \\ y = Yf_y + Zc_y \end{Bmatrix}$$

Where $$\begin{Bmatrix} u \\ v \end{Bmatrix}$$

are the coordinates of the point on sensor;

$$\begin{Bmatrix} X \\ Y \\ Z \end{Bmatrix}$$

is the 3D point coordinates (camera coordinate system)

$$\begin{Bmatrix} f_x \\ f_y \end{Bmatrix}$$

are the focal length in horizontal and vertical directions $$\begin{Bmatrix} c_x \\ c_y \end{Bmatrix}$$

is the position on the sensor of the optical axis

The distortion itself is applied on the intermediate variables $$\left\{ \begin{array}{c} x \\ y \end{array} \right\}$$

$$\left\{ \begin{array}{c} x_{corrected} \\ y_{corrected} \end{array} \right\} = \left\{ \begin{array}{l} x(1 + k_1 r^2 + k_2 r^4 + k_3 r^6) + 2p_1 xy + p_2(r^2 + 2x^2) \\ y(1 + k_1 r^2 + k_2 r^4 + k_3 r^6) + p_1(r^2 + 2y^2) + 2p_2 xy \end{array} \right.$$

Where
$r^2 = (x^2 + y^2)$ is the square of the distance from the center
$k_1, k_2, k_3$ are coefficients to take into account radial distortion (along radiuses)
$p_1, p_2$ are coefficients representing tangential distortion (distortion of the circle to an ellipse)

The parameters estimation is made by modeling with a function $\Psi$ the complete projection for each 3D point $(X_i, Y_i, Z_i)^T$ that is known (using a chessboard for instance) to the sensor $(u_i, v_i)^T$. Point onto the sensor can be detected via image processing techniques.

$$\Psi_{<r_{11},\ldots,r_{33},T_x,T_y,T_z,f_x,f_y,c_x,c_y,k_1,k_2,k_3,p_1,p_2>}{}^T(X_i,Y_i,Z_i) - (u_i,v_i)^T = 0$$

21 parameters are unknown but one can show that this can be reduced to 15 (rotation is equivalent to 3 parameters).

The proposed technique uses a direct measurement system of distortion of an optical system. Such technique comprises the following steps:

1. First of all, a classical (e.g. OpenCV based) calibration is done in order to get estimation of the intrinsics parameters of the camera corresponding to the following set of parameters: (focal lengths, position of intersection between sensor and the optical axis, distortion parameters);

2. Then a screen is placed in front of camera so that the screen plane is approximately perpendicular to the optical axis and we compute the extrinsic parameters between the camera and the screen. In that situation the screen is used as world coordinate system support; so some points at known positions onto the screen (this can be for instance a chessboard or a grid) can be selected and illuminated and then we measure the corresponding points imaged onto the sensor. With similar equations as those described previously, the extrinsic parameters can be estimated (rotation and translation).

Then, we select a number of pixels for which we want to measure the distortion. For instance we can use a regular grid to cover major parts of the sensor. For each selected pixel, we use the previous equations in reverse order that is, from the sensor, we de-project the point to compute the estimated position onto screen (We call this position $\vec{D}_0$). This de-projection is only possible because we know the relative position of screen versus the camera.

Then:
we select a small shape (region of pixels) at screen position closest to $\vec{D}_0$ (due to discretization of pixels there can be a small shift) and we measure the imaged shape position onto sensor;
we select a small shape (region of pixels) at position $\vec{D}_0 + a\vec{x}$ (some pixels at right of $\vec{D}_0$ position) and we measure its image position onto the sensor;
we select a small shape (region of pixels) at position $\vec{D}_0 + a\vec{y}$ (some pixels at downward of $\vec{D}_0$ position) and we measure its image position onto the sensor.

As result, we have measured three positions on the sensor. We can build two vectors from them: one vector corresponds to a movement of the shape in x direction on the screen and the second of a movement in vertical direction. These vectors can be normalized by divided them with a (displacement per graphic pixel) or by the metric distance represented by a graphic pixels.

As this operation can be made for any screen pixel in the optical system field of view defined by the sensor and the lens, we are able to collect a complete grid representing following information:

The deformation of the grid (so position of points) onto screen display represents the distortion of the lens.

The difference between the measured vectors and an orthogonal grid represents the local derivatives of the distortion.

Once deformation information (distortion displacement and derivative of distortion displacement) is obtained by this way, it is possible to modify the features of the optical system which are used for determining the chief ray. Therefore, the projection of the given pixel of the image sensor onto the screen of the display device is more accurate.

Figure 8:
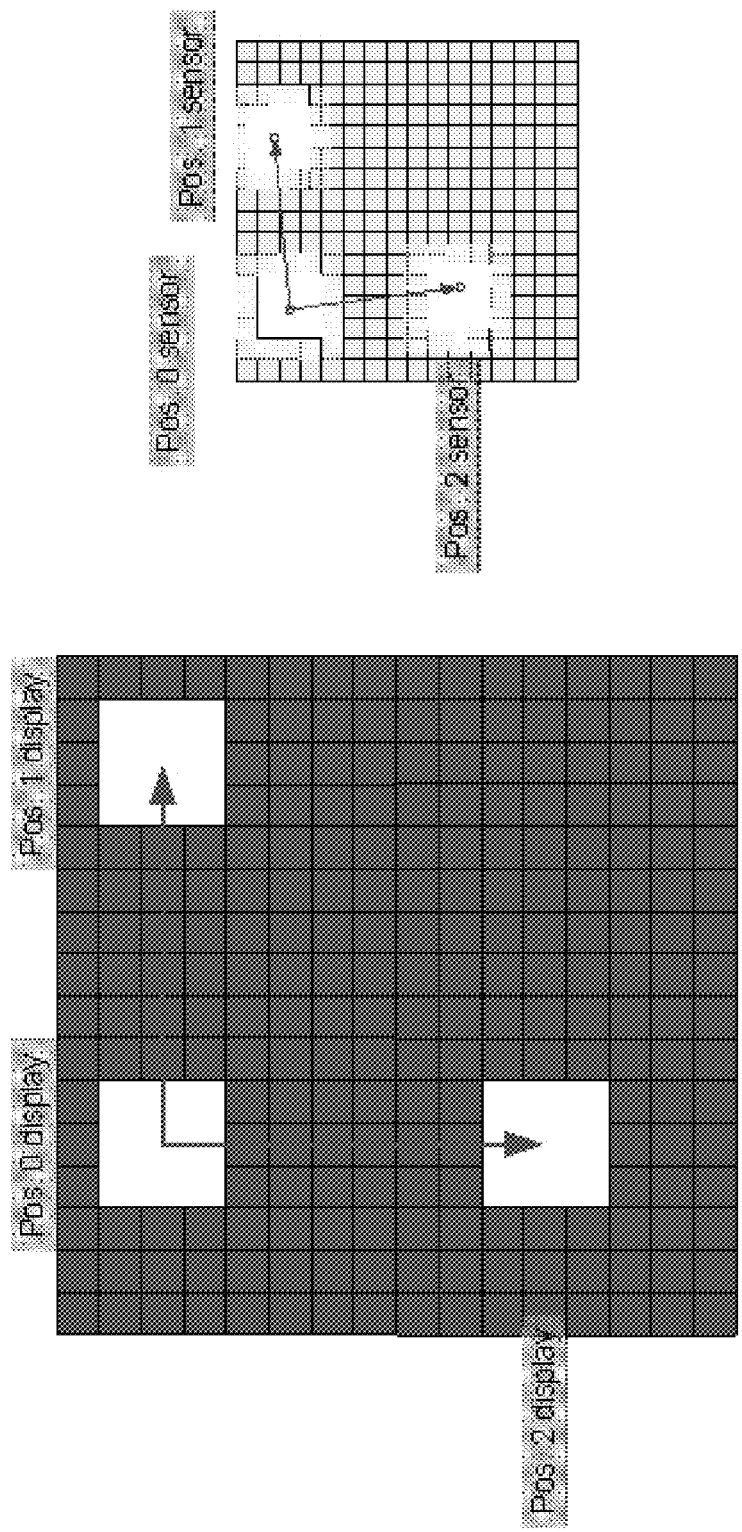
FIG. 8 presents the positioning of shapes onto the display (left part of the FIG. 8), and the corresponding extracted positions onto the image sensor (right part of the FIG. 8)

The FIG. 8 presents the positioning of shapes onto the display (left part of the FIG. 8), and the corresponding extracted positions onto the image sensor (right part of the FIG. 8).

Figure 9:
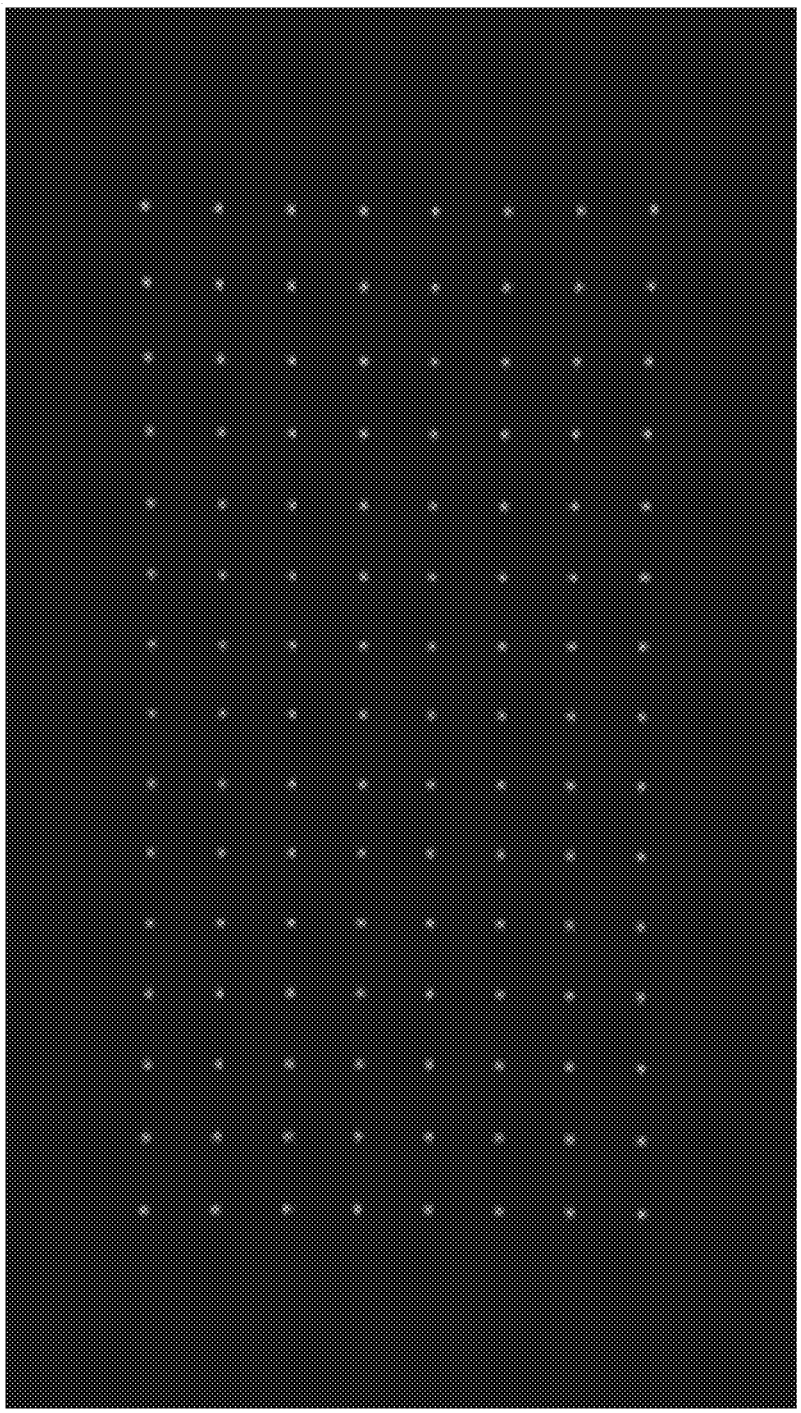
FIG. 9 presents an example of a snapshot of grid onto the graphic screen when making analysis of a grid of pixels.

The FIG. 9 presents an example of a snapshot of grid onto the graphic screen when making analysis of a grid of pixels.

Figure 10:
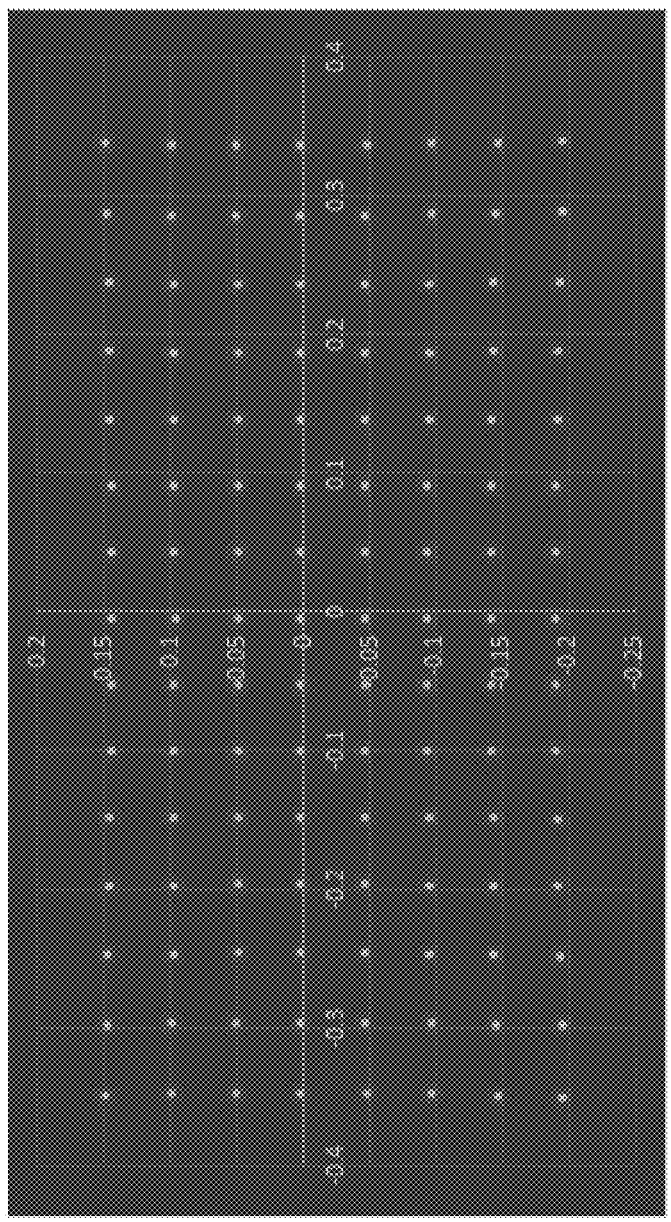
FIG. 10 presents a set of real 3D points replaced into the 3D camera coordinate system.

The FIG. 10 presents a set of real 3D points replaced into the 3D camera coordinate system. The points have been replaced at a normalized distance of 1m (units are metric).

Figure 11:
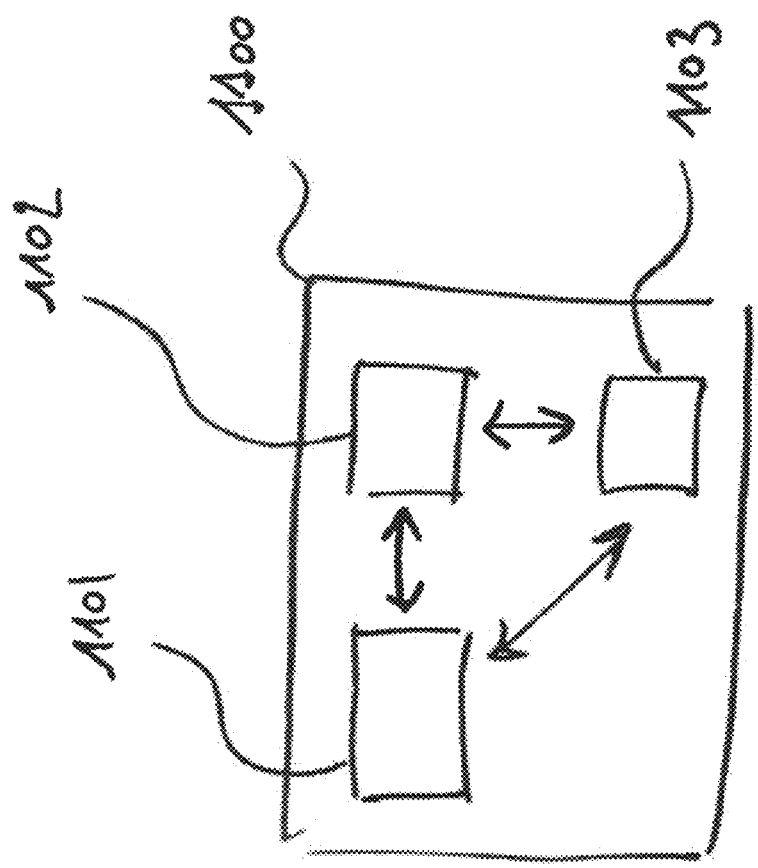
FIG. 11 presents an example of device that can be used to perform a method disclosed in the present document.

The FIG. 11 presents an example of device that can be used to perform a method disclosed in the present document.

Such device referenced 1100 comprises a computing unit (for example a CPU, for "Central Processing Unit"), referenced 1101, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 1102. Computer programs are made of instructions that can be executed by the computing unit. Such device 1100 can also comprise a dedicated unit, referenced 1103, constituting an input-output interface to allow the device 1100 to communicate with other devices. In particular, this dedicated unit 1103 can be connected with an antenna (in order to perform communication without contacts), or with serial ports (to carry communications "contact"). It should be noted that the arrows in FIG. 11 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In one embodiment of the disclosure, the electronic device depicted in FIG. 11 can be comprised in a camera device that is configure to capture images (i.e. a sampling of a light field). These images are stored on one or more memory units. Hence, these images can be viewed as bit stream data (i.e. a sequence of bits). Obviously, a bit stream can also be converted on byte stream and vice versa.

The invention claimed is:

1. A method for obtaining, for at least one pixel of an image sensor comprised in an optical device, parameters enabling generation of a hyperboloid of one sheet representation of a pixel beam, wherein the method comprises:

determining a direction of a chief ray associated with said at least one pixel of said image sensor from the features of an optical system associated with said optical device;

determining a set of pixels comprised in a screen of a display device, said set of pixels comprising at least one pixel, close to a point corresponding to an intersection of said chief ray and said screen, and said set of pixels comprising only pixels which are detected by said at least one pixel of said image sensor, when they are illuminated; and wherein said determining said set of pixels comprises:

illuminating at least one pixel around said point corresponding to the intersection of said chief ray and said screen;

verifying if said at least one illuminated pixel is detected by said at least one pixel of said image sensor; and wherein said method further comprises determining said parameters enabling generation of a hyperboloid of one sheet representation of said pixel beam associated with said at least one pixel of said image sensor from a subset of pixels comprised in said set of pixels, said subset of pixels corresponding to a cross section of said pixel beam.

2. The method according to claim 1, wherein said verifying associates a detected light intensity value by said least one pixel of said image sensor with said illuminated pixel on said screen.

3. The method according to claim 1, wherein said set of pixels corresponds to a matrix of pixels.

4. The method according to claim 1, wherein said subset of pixels has a shape close to a conic.

5. The method according to claim 1, wherein a plurality of set of pixels is determined, and each set of pixels being determined by changing a distance between the display device and the optical device.

6. The method according to claim 1, wherein, for a given distance between the display device and the optical device, a plurality of set of pixels is determined by performing said method in parallel for several pixels of said image sensor that are positioned far enough to each other in such way that no intersection of said plurality of set of pixels occurs.

7. The method according to claim 1, wherein said optical device is a conventional camera.

8. The method according to claim 7, wherein said direction of said chief ray is determined from a classical intrinsic/extrinsic calibration method.

9. The method according to claim 1, wherein said optical device is a plenoptic camera.

10. The method according to claim 9, wherein said direction of said chief ray is determined from focused images and a classical intrinsic/extrinsic calibration method.

11. The method according to claim 1, wherein, it further comprises modifying said features of said optical system associated with said optical device, said modifying comprising:

obtaining a distortion displacement associated with each pixel of said optical system;

obtaining derivative of distortion displacement associated with each pixel of said optical system;

modifying said features of said optical system associated with said optical device as a function of said distortion displacement and derivative of distortion displacement.

12. The method according to claim 11, wherein said distortion displacement is determined by:

selecting a set of pixels on the image sensor of the optical device;

obtaining positions of each pixels comprised in the set of selected pixels onto a display device, comprising a screen, delivering a set of positions; and for each position:

illuminating pixels of the screen around such position, pixels of the screen around a translation of such position according to a first direction, and pixels of the screen around a translation of such position according to a second direction which is perpendicular to said first direction;

detecting, at the image sensor, the positions of three pixel regions that have detected the illuminating pixels of the screen;

determining a variation of displacement and angle defined by a position of these three pixel regions compared to a 90° value.

13. An electronic device for obtaining, for at least one pixel of an image sensor comprised in an optical device, parameters enabling generation of a hyperboloid of one sheet representation of a pixel beam, the electronic device comprising a memory, and at least one processor coupled to the memory, wherein the at least one processor is configured to:

determine a direction of a chief ray associated with said at least one pixel of said image sensor from the features of an optical system associated with said optical device;

determine a set of pixels comprised in a screen of a display device, said set of pixels comprising at least one pixel close to a point corresponding to an intersection of said chief ray and said screen, and said set of pixels comprising only pixels which are detected by said at least one pixel of said image sensor, when they are illuminated; and wherein when the at least one processor determines said set of pixels, it is further configured to:

illuminate at least one pixel around said point corresponding to the intersection of said chief ray and said screen;

verify if said at least one illuminated pixel is detected by said at least one pixel of said image sensor; and wherein said at least one processor is further configured to determine said parameters enabling generation of a hyperboloid of one sheet representation of said pixel beam associated with said at least one pixel of said image sensor from a subset of pixels comprised in said set of pixels, said subset of pixels corresponding to a cross section of said pixel beam.

14. The electronic device according to claim 13, wherein when said at least one processor is configured to verify, it associates a detected light intensity value by said least one pixel of said image sensor with said illuminated pixel on said screen.

15. The electronic device according to claim 13, wherein said set of pixels corresponds to a matrix of pixels.

* * * * *